A. M. CRISMAN.
AUTOMATIC PLANTER AND CHECK ROWER.
APPLICATION FILED MAY 19, 1910.
995,225.
Patented June 13, 1911.
4 SHEETS—SHEET 1.
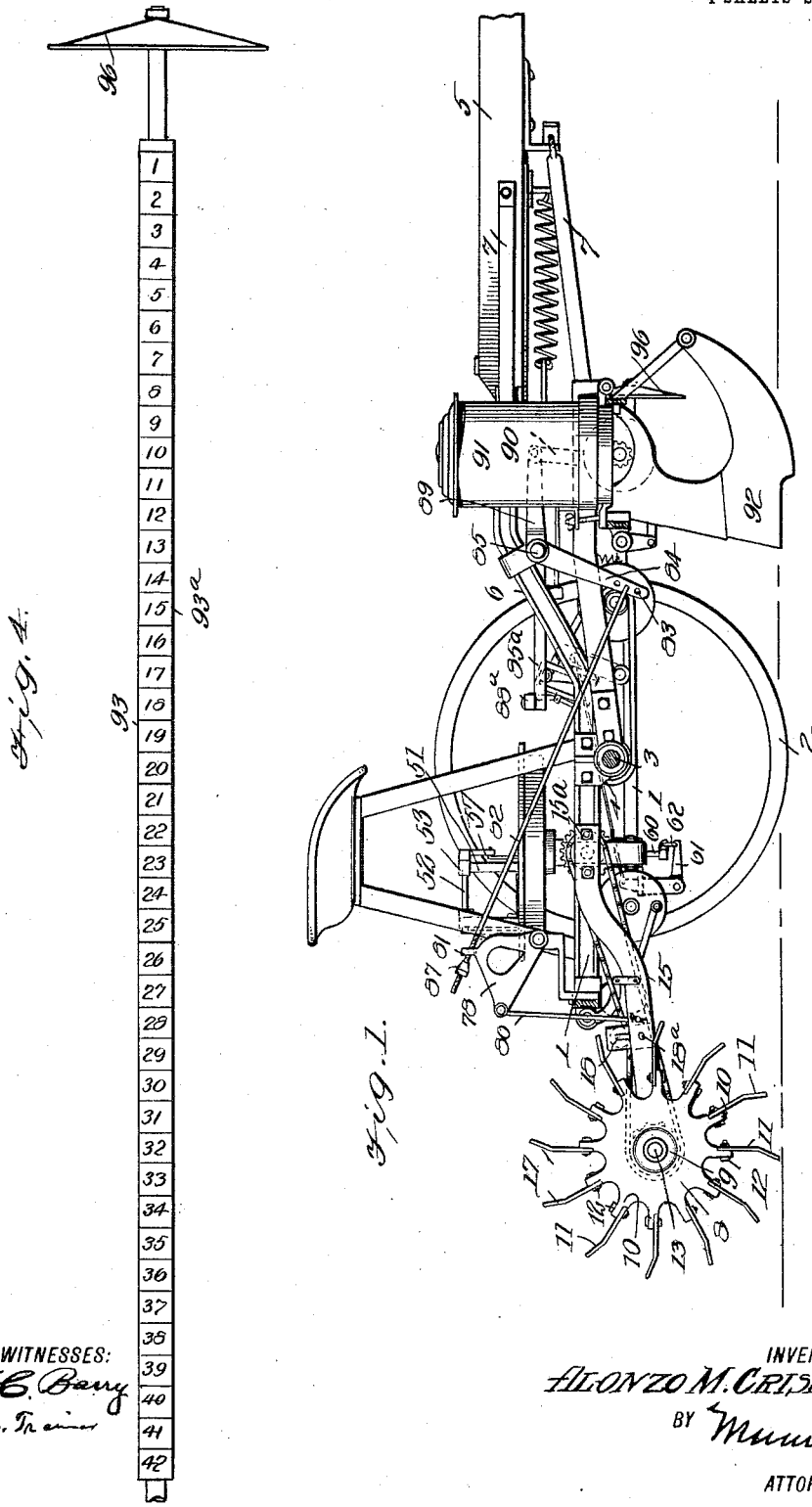
WITNESSES:
INVENTOR
ALONZO M. CRISMAN
BY
ATTORNEYS

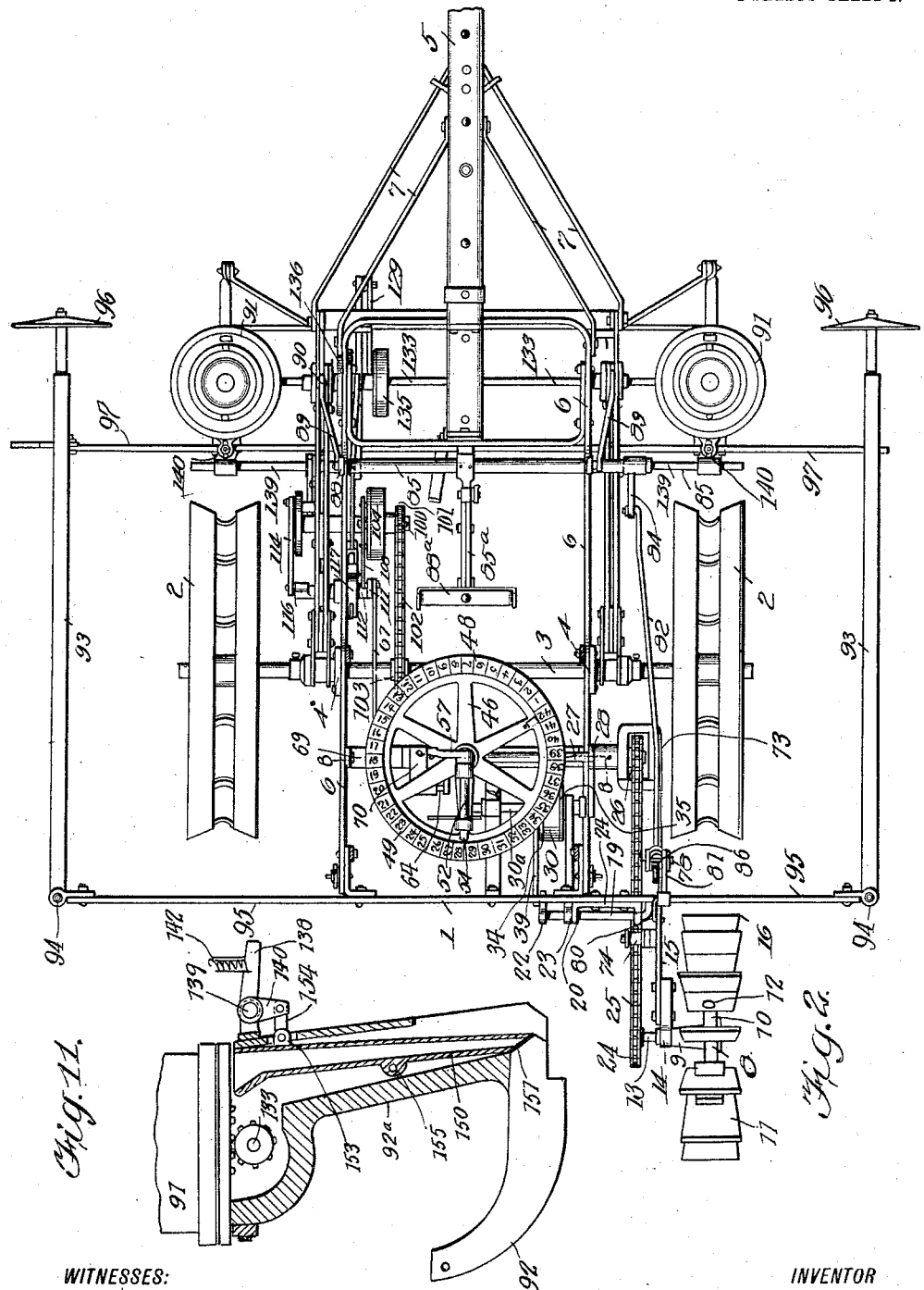

A. M. CRISMAN.
AUTOMATIC PLANTER AND CHECK ROWER.
APPLICATION FILED MAY 19, 1910.
995,225.
Patented June 13, 1911.
4 SHEETS—SHEET 3.
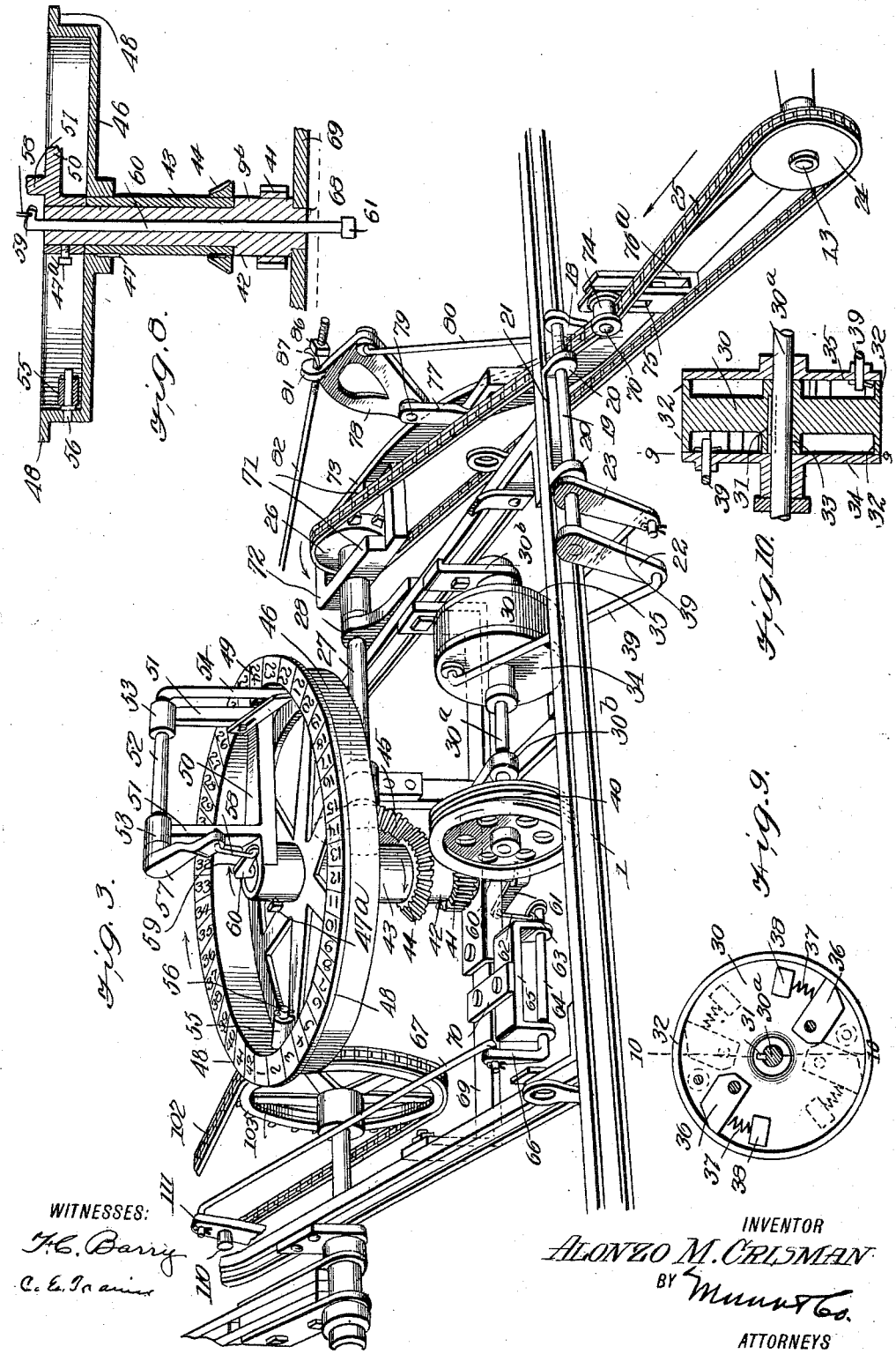
WITNESSES:
INVENTOR
Alonzo M. Crisman
BY
ATTORNEYS A. M. CRISMAN.
AUTOMATIC PLANTER AND CHECK ROWER.
APPLICATION FILED MAY 19, 1910.
995,225.
Patented June 13, 1911.
4 SHEETS—SHEET 4.
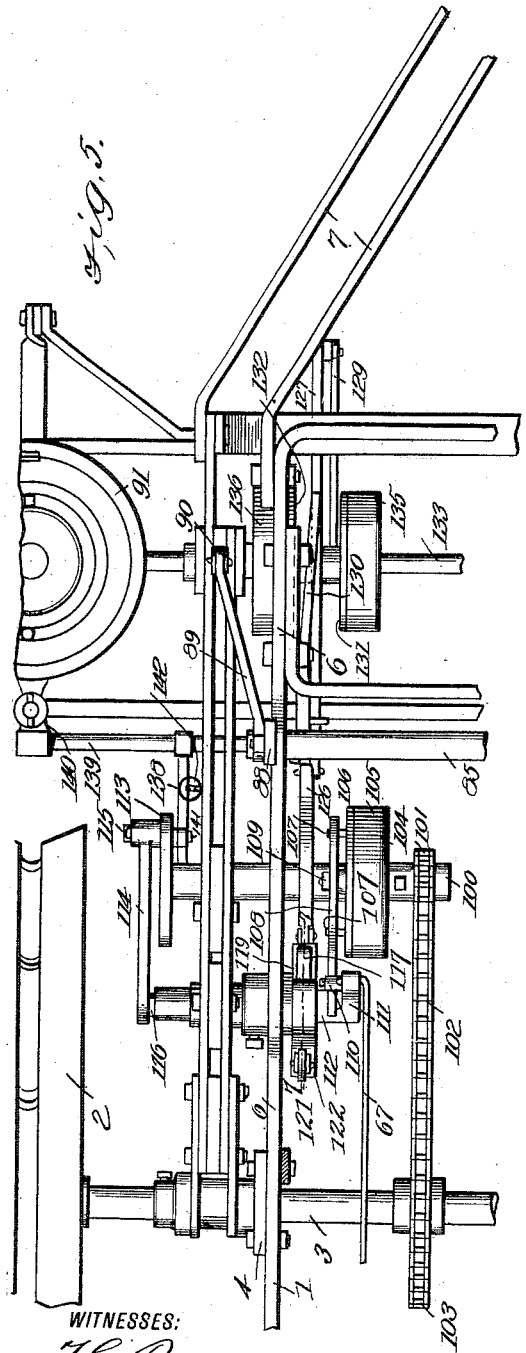
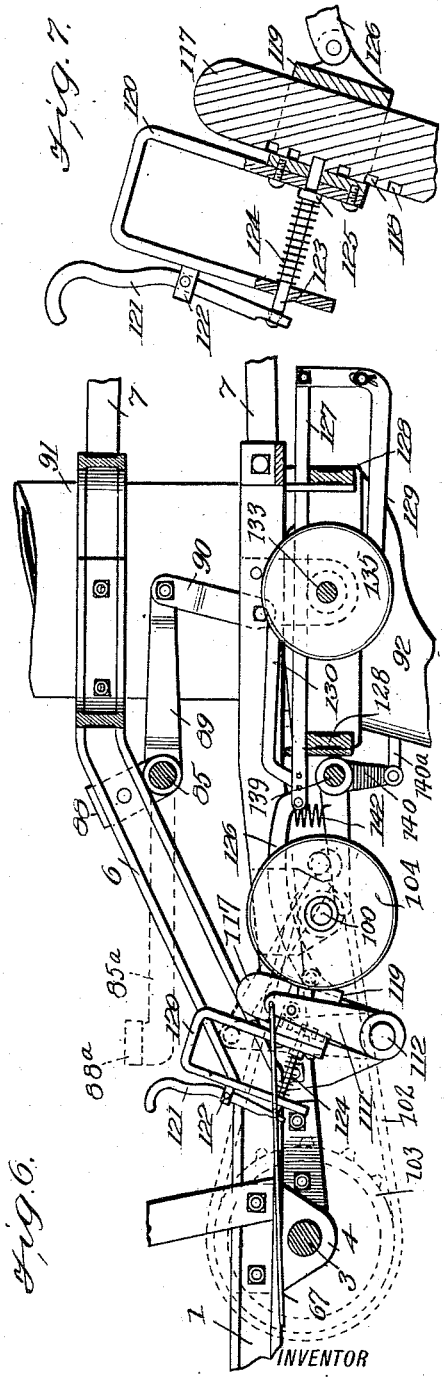
WITNESSES:
INVENTOR
ALONZO M. CRISMAN
BY
ATTORNEYS

UNITED STATES PATENT OFFICE.

ALONZO M. CRISMAN, OF DAVENPORT, IOWA.

AUTOMATIC PLANTER AND CHECK-ROWER.

995,225.  Specification of Letters Patent.  Patented June 13, 1911.

Application filed May 19, 1910. Serial No. 562,113.

*To all whom it may concern:*

Be it known that I, ALONZO M. CRISMAN, a citizen of the United States, and a resident of Davenport, in the county of Scott, State of Iowa, have invented certain new and useful Improvements in Automatic Planters and Check-Rowers, of which the following is a specification.

My invention is an improvement in automatic check rowers and planters, and consists in certain novel constructions and combinations of parts hereinafter described and claimed.

The present invention is an improvement over my prior Patent No. 866,339, dated September 17, 1907, and the object of the invention is to provide an automatic dropping device for depositing a predetermined number of grains in hills at equal horizontal distances from each other, regardless of the inequalities of the ground, and wherein a minimum of work is imposed on the measuring wheel, the actual operation of dropping being done by the carrying wheels.

Referring to the drawings forming a part hereof: Figure 1 is a side view of the improvement; Fig. 2 is a plan view; Fig. 3 is a perspective view of the compensating mechanism; Fig. 4 is a plan view of the marker; Fig. 5 is a plan view of the dropping mechanism and the mechanism for varying the quantity of seed to the hill; Fig. 6 is a side view of the same; Fig. 7 is a transverse section on the line 7—7 of Fig. 5 of the connection between the seed plate operating mechanism and the operating means therefor; Fig. 8 is a vertical section on the line 7—7 of Fig. 2 of the indicator wheel; Fig. 9 is a section on the line 9—9 of Fig. 10; Fig. 10 is a vertical section on the line 10—10 of Fig. 9 of the clutch; and Fig. 11 is a vertical section of the furrow opener and second dropping mechanism.

The present invention is a planter of the check rower type operated without the use of a wire, the wire being replaced by a measuring wheel running on the ground and actuating the dropping valves at predetermined intervals. The measuring wheel is turned by its contact with the ground, and in passing over uneven ground the hills will be at irregular intervals, since the wheel will actually travel a greater distance than the actual straight line distance between the hills, thus making the hills too close.

In the travel of the machine across a field the variations will attain to a considerable amount and it will be found practically impossible to make the hills in straight lines transversely as well as longitudinally, and the hills will be too near together. The present invention is designed to correct this fault.

The embodiment of the invention shown in the drawings comprises a main frame 1, which is supported by wheels 2 secured on an axle 3 which is journaled in bearings 4 on the frame. The frame is drawn by means of a tongue 5 which is connected to forward extensions 6 from the frame and is suitably braced by braces 7.

A measuring wheel 8 is secured to a shaft 13 journaled in a bearing 14 on an auxiliary frame 15 pivoted to the main frame in a manner to be described, and the wheel consists of a hub 9 having radial lugs 10, to which are secured blades 11 by bolts 12. The blades are somewhat fan-shaped as shown and are arranged with their large end outward, and each blade near its outer end is bent forwardly, as shown at 17.

A shaft 19 is journaled in bearings 20 in a bracket 21 on the main frame, and the outer end is provided with an arm 18 whose free end is pivoted to the auxiliary frame 15 at 18$^a$ in such manner that the movement of the frame vertically will oscillate the shaft 19. On the opposite side of the bracket from the arm 18 the shaft is provided with two rigid arms 22 and 23 which are connected to the compensating device to be described. The opposite end of the shaft 13 from the measuring wheel is provided with a sprocket wheel 24 connected by a chain 25 with a sprocket wheel 26 on a shaft 27 journaled in bearings 28 on the main frame and driving the indicator wheel to be described.

The compensating device, Figs. 3, 9 and 10, consists of a disk 30 keyed by a key 31 to a shaft 30$^a$ journaled in bearings 30$^b$ on the main frame and provided at each side with a marginal flange 32. The disk is provided with a hub 33 which extends on each side of the disk flush with the edge of the adjacent flange 32, and the disk forms the fixed member of a three part clutch. Disks 34 and 35 are journaled on each side of the first named disk, each abutting the edge of the adjacent flange 32 and the adjacent end of the hub 33, and to the inner face of each disk 34 and 35 is pivoted a plurality of pawls 36, each of which engages the inner face of the adjacent flange 32 of the disk 30. A spring 37 is arranged between each pawl and a block 38 secured to the face of the disk to which the pawl is pivoted and acts to press the pawl into engagement with the flange.

The pawls 36 on the disks 34 are arranged in the opposite direction to the pawls on the disk 35, and each disk is connected by a link 39 with one of the arms 22, 23 on the shaft 19, the disk 34 being connected to the arm 22 and the disk 35 to the arm 23. A worm wheel 40 is secured to the end of the shaft 30$^a$ and meshes with a gear wheel 41 on a hollow shaft 42 journaled in a sleeve 43 having at its lower end a bevel gear 44 which meshes with a bevel gear 45 on the horizontal shaft 27 before mentioned.

A cup-shaped indicator wheel 46 is secured to the upper end of the sleeve 43 by a key 47, and the sleeve is secured to the hollow shaft by a set-screw 47$^a$, and the rim of the wheel is provided with a lateral annular flange 48 having a series 49 of numerals thereon, the numerals representing inches, running from 1 to 42 and being arranged consecutively. A radial arm 50 is secured to the sleeve 43 above the wheel and at each end the arm is provided with a standard 51.

A shaft 52 is journaled in bearings 53 on the upper ends of the standards, and at its outer end the shaft is provided with a depending tappet 54 which is adapted for engagement with a roller 55 journaled on an inwardly projecting radial pin 56 connected with the rim of the wheel 46.

At its opposite or inner end the shaft is provided with a lateral arm 57 which is connected by a link 58 with the angular end 59 of a rod 60 slidable through the hollow shaft 42 before mentioned. The lower end of the rod 60 is provided with a lateral arm 61 connected by a link 62 with a crank arm 63 on a shaft 64 journaled in a bearing bracket 65 on the frame and having at its other end a lateral arm or crank 66 connected by a link 67 with the dropping mechanism of the planter for tripping the same.

The operation of the measuring wheel compensator, and indicator is as follows: The indicator wheel is driven by the measuring wheel continuously by means of the sprocket chain 25, and the shaft 27, and when the said wheel makes a complete revolution the roller 55 engages the tappet 54, oscillating the shaft 52, and through the arm 57, link 58, rod 60 and shaft 64 the dropping mechanism is tripped. This operation occurs at regular intervals, and if the measuring wheel is passing over perfectly level ground the hills will be at exactly equal distances apart. If, however, the wheel is passing over uneven ground the auxiliary frame will be tilted, and whenever it is tilted the shaft 30$^a$ will be advanced. When the measuring wheel enters a depression, one set of pawls will advance the shaft, and when it moves out of the depression the other set of pawls will advance the shaft. Every advancement of the shaft 30$^a$ advances the indicator wheel so that, whatever the actual distance traveled by the measuring wheel, the grain will be dropped at equal direct straight line distances. For instance, if the actual travel of the measuring wheel is three inches greater than the straight line distance between the two hills, the indicator wheel will be advanced in its travel three inches.

The roller 55 is set at the division line between the numerals 1 and 2 and the divisions of the scale represent inches, so that with the indicator wheel shown the hills will be 42 inches apart in a straight horizontal line.

The hollow shaft 42 is journaled in a step bearing 68 in a cross bar 69 on the frame, and the bearing bracket 65 is connected by a strap 70 with the same bar. The sprocket wheel 26 on the shaft 27 is secured between the arms 71 of a stirrup 72 journaled on the shaft and connected with the forward end of the auxiliary frame 15, and an idler 74 bears on the chain 25 and the shaft 76 thereof is slidably mounted in slots 75 in a U-shaped bracket 76$^a$, secured to the auxiliary frame. The auxiliary frame 15 is thus pivoted on the shaft 27.

A bar 77 is secured to the main frame extending upwardly therefrom, and a substantially triangular rocker 78 is pivoted at 79 to the bar. A link 80 connects one corner of the rocker to the auxiliary frame, and the rocker is provided with a perforated ear 81 through which passes one end of a rod 82, the other end having an angular portion engaging one of a series 83 of orifices in one arm 84 of a rock shaft 85. The end of the rod adjacent to the ear is threaded and engaged by a nut 86 on the opposite side of the ear, and a curved washer 87 is arranged between the nut and the ear.

The rock shaft 85 is journaled transversely of the main frame and is provided at approximately its center with a rearwardly extending arm 85$^a$, to which is secured a foot plate 88$^a$. It will be evident that when the foot plate is depressed the rocker 78 will be swung forward and the auxiliary frame will be lifted to disengage the measuring wheel from the ground and to prevent further movement of the tripping mechanism.

The usual furrow opener 92 is arranged below the dropping mechanism, and near each end the rock shaft 85 is provided with a forwardly extending arm 89, which is connected by a link 90 with the supporting frame of the furrow opener, so that when the measuring wheel is lifted the furrow openers will be also lifted.

It is desirable that the hills be in straight lines transversely of the field, and for this reason it is essential that the first hill of each new row started be in exact line with the last hill of the row just completed. To attain this end the following mechanism is provided. A guide bar 93 is hinged at 94 to an extension 95, at each side of the rear of the main frame, and a wheel or disk 96· is journaled on the free end of each bar. The frame is also provided with an extension 97, at the front at each side upon which the bar rests when not in use. When in operation, the bar 93 on the unplanted side of the planter is extended and it will be observed that the hinge connection is a rule joint so that the bar is held at right-angles to the direction of movement of the machine.

A guide rope not shown of ordinary construction may be made use of, extending from the outer end of the bar to the frame of the machine. When the end of the field is reached and a turn is to be made, the extended bar is first drawn inwardly into folded position by a guide rope, the free end of the bar resting on the adjacent extension 97 of the frame. The indicator wheel is consulted at this time and the number under the pointer or indicator is noted. For instance, let the said number be 20. A stake is then placed in the ground close to the numeral 20 on the scale and the said stake locates the cross row. Leaving the stake in this position, the planter is turned around in the usual way and lined up for the next row without any reference to the numerals of the scale, the planter being stopped at any of the 42 numerals.

When the machine is stopped, the numeral of the scale nearest the stake is noted for instance 30. The numeral 30 of the indicator wheel 46 is now placed under the pointer. This places the tappet 54 and the roller 55 the same relative distances from each other as the numeral 42 on the scale of the bar is from the stake. By starting the planter when the roller 55 on the indicator wheel has reached the tappet 54, the numeral 42 on the scale 93ª has also reached the stake. No calculation is required on the part of the operator, he simply reading the numeral indicated by the machine. The numerals on the indicator wheel and the scale on the bar combined with the marking wheel constitutes the starting device and is a feature of importance in the invention, being an improvement and a simplification of the similar device described and claimed in my former Patent 866,339. The improvement lies in the use of a single set of numerals on both the indicator wheel and the scale, and the scale is fixed, thus removing in a large measure the possibility of error.

It will be evident that the above described operation can be performed by the driver without the necessity of his leaving his seat, thus saving a great amount of time, increasing the capacity of the planter, and insuring that the hills will be in alinement in two directions, and at mathematically exact distances apart in the row, regardless of inequalities in the surface of the ground.

To permit the quantity of grain deposited in the hill to be varied at the will of the operator the following mechanism forming the subject of my co-pending application Ser. No. 562,114, filed May 19, 1910 is provided. A shaft 100 is journaled on the frame of the planter (Figs. 5, 6 and 7) and is provided at one end with a sprocket wheel 101 connected by a chain 102, with a sprocket wheel 103 on the axle 3.

A disk 104 forming the movable part of a clutch and provided with an overhanging marginal flange 105 is journaled loosely on the shaft 100 adjacent to the sprocket wheel, and a second disk 106 forming the fixed part of the clutch is keyed to the shaft 100. The disk 104 is normally clutched to the disk 106. Pins 107 are provided for operating the clutching device to release the disks, each pin extending through the disk 106 into an opening in a lever 108 pivoted at 109 intermediate the pins 107. The free end of the lever is in position for engagement by a roller 110 on an arm 111 journaled on a shaft 112 journaled on the frame, and the arm is connected by the link 67 before mentioned with the tripping arm 66 operated by the indicator wheel.

A disk 113 is secured to the opposite end of the shaft 100 and a link 114 connects a wrist pin 115 on the disk with a crank arm 116 on the shaft 112. The shaft 112 is also provided with an arm 117 having in one face thereof a series 118 of openings, and a sleeve 119 is slidable on the arm. A stirrup 120 is secured to the sleeve and a lever 121 is pivoted to a lug 122 on the outer arm of the stirrup.

A pin 123 is secured to one end of the lever and passes through alined openings in the arms of the stirrup and engages one of the series of openings to hold the sleeve in adjusted position. A spring 124 encircles the pin between the outer arm of the stirrup and a collar 125 on the pin and normally holds the pin in engagement with the opening.

It will be evident that by releasing the pin the sleeve may be adjusted radially of the shaft 112, and a link 126 connects the sleeve 119 with a sliding substantially rectangular frame 127 moving on guides 128 on the frame. Connecting rods 129 and 130 are pivoted to the opposite corners of the frame and connect the frame with disks 131 and 132 on a shaft 133, each disk being the loose member of the clutch shown and described in my prior Patent No. 866,339, dated September 17, 1907.

The shaft 133 is the seed plate operating shaft, being connected to the plates in any suitable manner, the said plates being arranged in the containers or hoppers 91. The connecting rods 129 and 130 are connected with the clutch members at diametrically opposite points, as shown, and when moved in one direction each clutch disk clutches the fixed member 135 or 136, each of which is keyed to the shaft 133. The arrangement of the clutches is such that as the sliding frame reciprocates in either direction one clutch is connected, so that the shaft 133 is rotated at each movement of the frame to operate the seed plates.

The operation of the above mechanism is as follows. As the shaft 100 is rotated the lever 108 is engaged with the roller 110, which is moved into engaging position by the measuring wheel, and when the lever is so engaged the clutch is released, so that the shaft 100 is disconnected from the axle 3. The movement of the arm 111 takes place at regular intervals, and the shaft 112 is rotated by the shaft 100 through the disk 113, link 114, and arm 116. The shaft 112 operates the sliding frame, which in turn operates the seed plates driving shaft 133. The said plates, shown and described in my co-pending application Serial No. 562,115 filed May 19, 1910, are provided with a plurality of cells, each holding a specified number of grains, as, for instance, one. As the plates rotate the cells are moved past a delivery point and drop their contents at such point. When a sufficient quantity is collected a valve is opened and the seeds are deposited in the hill.

The speed of the shaft 133, and consequently the speed of the seed plates, may be varied by moving the sleeve radially on the arm to cause the said plates to deliver a greater or less number of seeds in a specified time. If, for instance, the sleeve is in such position on the arm 117 that two cells will pass the delivery point between trips of the valves, then to obtain a greater number of seed to the hill the sleeve is moved outwardly, thus causing a higher speed of the plates.

The valves of the container 91 deliver into the furrow openers 92 and are operated by an arm 138 secured to a shaft 139 journaled on the frame, and the shaft is provided with arms 140 connected to the valves for operating them by links 140ᵃ. A roller 141 is secured to the inner face of the disk 113 and engages the arm 138 once during each rotation of the disk. The arm is normally held in position for engagement with the roller by a spring 142 which returns it to its original position after it has been moved by the roller.

When the clutch is disengaged in the manner described the roller 141 is almost in contact with the arm, and when the clutch is again engaged the roller swings the arm downwardly, and the valves are opened to deposit the quantity of seed collected. During the opening of the valves the seed plates are stationary because the wrist pin 115 on the disk 113 is passing the dead center, and there is for a moment no movement of the shaft 133.

The supporting frame for the said boxes or containers, and its connection with the main frame, forms the subject matter of my copending application Serial No. 562,116 filed May 19, 1910, and for this reason is not more particularly described.

As shown in Fig. 11, a valve in the form of a chute 150 is arranged within the seed indicating tube 92ᵃ and the bottom of the chute is closed by an inclined plate 151, forming a part of the furrow opener. The lower end of the chute is beveled as shown, and fits closely against the plate so that when the chute is in the position shown in Fig. 11 the bottom thereof is closed. The chute is provided at approximately its center with a lug 155, having a transverse opening for receiving a bolt or pin to pivot the chute within the furrow opener. The valve is also provided near its top with a lug 153, to which is pivoted one end of a link 154, whose opposite end is pivoted to the arm 140 on the shaft 139, before mentioned. The lower end of the valve abuts against the plate 151 which closes the valve. It will be obvious that when the shaft 139 is oscillated by the mechanism just described, the lower end of the valve will be moved rearwardly to permit the charge of corn deposited within by the seed plates to fall into the furrow opened by the furrow opener.

I claim:

1. A planter, comprising a frame, an axle on the frame, wheels secured to the axle, an auxiliary frame pivoted to the main frame, a measuring wheel journaled on the auxiliary frame, an indicator wheel, a driving connection between the measuring wheel and the indicator wheel, a tripping device for the seed plate operating mechanism, a roller on the indicator wheel for actuating the tripping device, a shaft journaled parallel with axis of the measuring wheel, said shaft having a lateral arm pivoted to the auxiliary frame whereby the tilting of the frame will oscillate the shaft, a clutch shaft adjacent to said shaft, a plurality of disks secured to the shaft, a disk loosely journaled on the shaft adjacent to each disk, spring pressed pawls on the loose disks engaging the fixed disks for moving the fixed disks with the loose disks when said loose disks are moved in one direction, the pawls on one loose disk being oppositely arranged with respect to the pawls on the other loose disk, a connection between each loose disk and the shaft to which the auxiliary frame is pivoted for moving said disks when the shaft is oscillated, a plurality of dropping devices, a furrow opener below each device, and a common means for lifting the auxiliary frame and the dropping devices and furrow openers.

2. A planter, comprising a frame, an axle on the frame, wheels secured to the axle, an auxiliary frame pivoted to the main frame, a measuring wheel journaled on the auxiliary frame, an indicator wheel, a driving connection between the measuring wheel and the indicator wheel, a tripping device for the seed plate operating mechanism, a roller on the indicator wheel for actuating the tripping device, a shaft journaled parallel with axis of the measuring wheel, said shaft having a lateral arm pivoted to the auxiliary frame whereby the tilting of the frame will oscillate the shaft, a clutch shaft adjacent to said shaft, a plurality of disks secured to the shaft, a disk loosely journaled on the shaft adjacent to each disk, spring pressed pawls on the loose disks engaging the fixed disks for moving the fixed disks with the loose disks when said loose disks are moved in one direction, the pawls on one loose disk being oppositely arranged with respect to the pawls on the other loose disk, and a connection between each loose disk and the shaft to which the auxiliary frame is pivoted for moving said disks when the shaft is oscillated.

3. A planter, comprising a frame, an axle on the frame, wheels secured to the axle, an auxiliary frame pivoted to the main frame, a measuring wheel journaled on the auxiliary frame, an indicator wheel, a driving connection between the measuring wheel and the indicator wheel, a tripping device for the seed plate operating mechanism, a roller on the indicator wheel for actuating the tripping device, a shaft journaled on the frame and having a lateral arm to which the auxiliary frame is pivoted whereby to oscillate the shaft when the frame tilts, a clutch shaft on the frame, a plurality of disks on the shaft, a clutch for connecting each disk with the shaft when the disk moves in one direction, said clutch being oppositely arranged, and a connection between each disk and the shaft to which the auxiliary frame is pivoted for moving said disks when the shaft is oscillated.

4. A planter, comprising a frame, an axle on the frame, wheels secured to the axle, an auxiliary frame pivoted to the main frame, a measuring wheel journaled on the auxiliary frame, an indicator wheel, a driving connection between the measuring wheel and the indicator wheel, a tripping device for the seed plate operating mechanism, a roller on the indicator wheel for actuating the tripping device, and a connection between the auxiliary frame and the indicator wheel for advancing said wheel when the auxiliary frame moves vertically.

5. In a planter, a frame, dropping mechanism on the frame, a tripping device for the dropping mechanism, an indicator wheel having means for actuating the said device once on each rotation of the wheel, a measuring wheel, a connection between said wheel and the indicator wheel for operating the same, an auxiliary frame on which the measuring wheel is journaled, means whereby the vertical movement of the frame will advance the indicator wheel, a furrow opener for each dropping device, and means for simultaneously lifting the auxiliary frame and the furrow opener.

6. In a planter, a frame, dropping mechanism on the frame, a tripping device for the dropping mechanism, an indicator wheel having means for actuating the said device once on each rotation of the wheel, a measuring wheel, a connection between said wheel and the indicator wheel for operating the same, an auxiliary frame on which the measuring wheel is journaled, and means whereby the vertical movement of the frame will advance the indicator wheel.

7. In a planter, a frame, dropping mechanism on the frame, a tripping device for the dropping mechanism, an indicator wheel having means for actuating the said device once on each rotation of the wheel, a measuring wheel, a connection between said wheel and the indicator wheel for operating the same, means for mounting the measuring wheel for vertical movement with respect to the frame, and means whereby the vertical movement of the measuring wheel will advance the indicator wheel.

8. In a planter, a dropping mechanism, a tripping device for the said mechanism, an indicator wheel having means for operating the said device once during each rotation of the wheel, a measuring wheel, said wheel being movable vertically with respect to the indicator wheel, a driving connection between the measuring wheel and the indicator wheel, and means whereby the vertical movement of the measuring wheel will advance the indicator wheel.

9. In a planter, a dropping mechanism, a tripping device therefor, means for actuating the said device at predetermined intervals, a measuring wheel for operating the actuating means, said wheel being movable vertically with respect to the actuating means, and means whereby the vertical movement of the said wheel will advance the operation of the actuating means.

10. In a planter, a shaft for operating the seed plates, a reciprocating frame, a connection between the frame and the shaft for rotating said shaft in one direction when the frame is reciprocated, a shaft having a radial arm, a sleeve adjustable on the arm and connected to the frame, a driving shaft, a driving connection between the said shaft and the axle, a measuring wheel for releasing the said connection at predetermined intervals, a driving connection between the driving shaft and the shaft with the radial arm, a disk on the driving shaft, a roller on the disk, and means for opening the valves of the planter operated by the roller when it passes the dead center of the driving shaft.

11. In a planter, a shaft for operating the seed plates, a reciprocating frame, a connection between the frame and the shaft for rotating said shaft in one direction when the frame is reciprocated, a shaft having a radial arm, a sleeve adjustable on the arm and connected to the frame, a driving shaft, a driving connection between the said shaft and the axle, a measuring wheel for releasing the said connection at predetermined intervals, a driving connection between the driving shaft and the shaft with the radial arm, means for opening the valves of the planter, and means on the driving shaft for operating the said means when the driving shaft first begins to rotate.

12. In a planter, a shaft for operating the seed plates, a reciprocating frame, a connection between the frame and the shaft for rotating said shaft in one direction when the frame is reciprocated, a shaft having a radial arm, a sleeve adjustable on the arm and connected to the frame, a normally operative driving connection between the said shaft and the axle of the planter, a measuring wheel for releasing the said connection at predetermined intervals, and means operated by the commencement of movement of the said shaft for opening the valves of the planter.

13. In a planter, means for rotating the seed plates, a driving connection between the said means and the axle of the planter, a measuring wheel for releasing the said connection at predetermined intervals, means for varying the relative speed of the seed plates and the axle, means for opening the valves of the planter, and means operated by the axle for actuating said means prior to the commencement of movement of the seed plates.

14. In a planter, means for rotating the seed plates, a driving connection between the said means and the axle of the planter, a measuring wheel for releasing the said connection at predetermined intervals, means for opening the valves of the planter, and means operated by the axle for actuating said means prior to the commencement of movement of the seed plates.

15. In a planter, means for rotating the seed plates, a driving connection between the said means and the axle of the planter, a measuring wheel for releasing the said connection at predetermined intervals, and means for varying the relative speed of the seed plates and the axle.

16. In a planter, a seed container, a seed plate rotatable therein and provided with a plurality of cells, a shaft for operating the plate, means for opening the valves of the planter to deposit the seed, a releasable driving connection between the axle of the planter and the seed plate operating shaft, a tripping mechanism for releasing the connection at predetermined intervals, an indicator wheel for operating the said mechanism, a measuring wheel for driving the indicator wheel, a vertically movable frame on which the measuring wheel is journaled, means whereby the vertical movement of the frame will advance the indicator wheel independently of the driving connection between the said wheel and the measuring wheel, a disk on the seed plate operating shaft, a roller on the disk, an arm for actuating the valve opening means in position for engagement by the roller as it passes the dead center of the shaft, and means whereby the seed plate operating shaft will actuate the valve opening means at the beginning of its movement when connected with the axle.

17. In a planter, a seed container, a seed plate rotatable therein and provided with a plurality of cells, a shaft for operating the plate, means for opening the valves of the planter to deposit the seed, a releasable driving connection between the axle of the planter and the seed plate operating shaft, a tripping mechanism for releasing the connection at predetermined intervals, a disk on the shaft, a roller on the disk, and an arm in connection with the valve opening means for actuating the same and in position for engagement by the roller as it passes the dead center of the shaft.

18. In a planter, a seed container, a seed plate rotatable thereon and provided with a plurality of cells, a shaft for operating the plate, means for opening the valves of the planter to deposit the seed, a releasable driving connection between the axle of the planter and the seed plate operating shaft, an indicator wheel having means for releasing the connection, a vertically movable measuring wheel for driving the indicator wheel, means whereby the vertical movement of the measuring wheel will advance the indicator wheel independently of the driving connection, and means on the shaft for actuating the valve opening means when the shaft begins to rotate.

19. In a planter, a seed container, a seed plate rotatable therein and provided with a plurality of seed cells, a releasable driving connection between the axle of the planter and the seed plate for operating the same, a tripping mechanism for releasing the connection at predetermined intervals, a vertically movable measuring wheel for actuating the tripping mechanism, means whereby the vertical movement of the wheel will advance the action of the tripping mechanism, and means for opening the valves of the planter operated by the starting of the said plates.

20. In a planter, a seed container, a seed plate rotatable therein and provided with a plurality of seed cells, a releasable driving connection between the axle of the planter and the seed plate for operating the same, a tripping mechanism for releasing the connection at predetermined intervals, and means for opening the valves of the planter operated by the starting of the seed plates.

21. In a planter, a seed container, a seed plate rotatable therein and provided with a plurality of seed cells, a releasable driving connection between the axle of the planter and the seed plate for operating the same, a measuring wheel for actuating the tripping mechanism at predetermined intervals, and means operated by the commencement of movement of the seed plates for opening the valves of the planter.

22. In a planter, a dropping mechanism, a tripping device therefor, means for actuating the said device at predetermined intervals, means operated by the movement of the planter for operating the actuating means, said means being vertically movable with respect to the actuating means, and means whereby the vertical movement of the said means will advance the operation of the actuating means.

23. In a planter of the character specified, a wheel supported frame, a measuring wheel journaled on the frame, an indicator wheel rotated by the measuring wheel, said indicator wheel having an annular scale on its face concentric with its axis of rotation, a dropping device, a tripping mechanism for the dropping device, a roller on the indicator wheel for operating the tripping mechanism, a marking bar hinged to the frame, a rest on the frame for the bar, and a wheel on the free end of the bar, said bar having a scale arranged longitudinally thereof and corresponding to the scale on the indicator wheel.

ALONZO M. CRISMAN.

Witnesses:
JOSEPH J. BRUS,
FERD A. MOELLER.

---

Copies of this patent may be obtained for five cents each, by addressing the "Commissioner of Patents, Washington, D. C."